Patented Oct. 13, 1925.

1,556,641

UNITED STATES PATENT OFFICE.

MAX SKOLNIK, OF MINNEAPOLIS, MINNESOTA, ASSIGNOR TO ANNIE SKOLNIK, OF MINNEAPOLIS, MINNESOTA.

PLASTIC COMPOSITION.

No Drawing.   Application filed December 24, 1921.   Serial No. 524,764.

*To all whom it may concern:*

Be it known that I, MAX SKOLNIK, a citizen of the United States, residing at Minneapolis, in the county of Hennepin and State of Minnesota, have invented certain new and useful Improvements in Plastic Compositions, of which the following is a specification.

My invention relates to plastic compositions. An object of my invention is to produce a composition suitable for use as plaster board, cores for veneers and for other purposes where it is desirable to use a plastic composition which will harden into a tough and durable product having great strength, and into which nails may be driven and which, at the same time, is of light weight, and may be readily pressed into comparatively thin sheets. Another object is to produce a composition of this character which is composed of a large portion of scrap material and which is, therefore, economical to manufacture.

The full objects and advantages of my invention will appear in connection with the detailed description thereof, and the novel features embodied in my inventive idea will be particularly pointed out in the claim.

In preparing my composition, I preferably make up a batch by using the following amounts of the various ingredients which are preferably mixed in the following manner: I take twenty-five pounds of corn stalks or similar stalks having a soft center and reduce the same to a pulp preferably using for this purpose about two pounds of potassium carbonate. When entirely reduced, this material is dried to take out all the moisture; five pounds of paste, such as flour paste, is then mixed with this material to form what will be designated the first mixture. To produce what will be termed the second mixture, I reduce twenty-five pounds of waste paper preferably using for this purpose about two pounds of potassium carbonate. To produce what will be designated the third mixture, I mix twenty-five pounds of sawdust with five pounds of glue. These three mixtures are then thoroughly mixed together and fifteen pounds of wood fiber plaster added. The resulting product which is in a plastic condition is then pressed into the desired shape as by rolling it into sheet-like form between two sheets of paper. The term wood-fibre plaster refers to a well-known commercial product, composed of wood-fibre and plaster. The term "cornstalks" when used in the claim is to be considered as including other stalks of a similar nature. It is, of course, obvious that batches of different sizes may be mixed using substantially the same proportions and that the proportions may be somewhat varied although I have found by experiment that the proportions above mentioned and the particular order of mixing stated give the best results.

I claim:

A composition for use in making a plastic composition comprising the following ingredients in substantially the proportions specified: corn and similar stalks, 25 pounds reduced to a pulp with 2 pounds of alkali, and an adhesive 5 pounds.

In testimony whereof I hereunto affix my signature.

MAX SKOLNIK.